United States Patent
Sahota

(10) Patent No.: US 10,857,925 B1
(45) Date of Patent: Dec. 8, 2020

(54) BATTERY OPERATED AUTONOMOUS ROBOTIC TRASH CAN CARRIER

(71) Applicant: Taranpreet Randhawa Sahota, Houston, TX (US)

(72) Inventor: Taranpreet Randhawa Sahota, Houston, TX (US)

(73) Assignee: Taranpreet Randhawa Sahota, Houston, TX (US)

( * ) Notice: Subject to any disclaimer, the term of this patent is extended or adjusted under 35 U.S.C. 154(b) by 0 days.

(21) Appl. No.: 15/929,693

(22) Filed: May 15, 2020

Related U.S. Application Data

(60) Provisional application No. 62/704,218, filed on Apr. 28, 2020.

(51) Int. Cl.
| | | |
|---|---|---|
| *B60P 1/64* | (2006.01) | |
| *B60P 1/43* | (2006.01) | |
| *B65F 1/14* | (2006.01) | |
| *B60L 50/60* | (2019.01) | |
| *B60K 1/04* | (2019.01) | |
| *B60Q 1/50* | (2006.01) | |
| *B60L 53/51* | (2019.01) | |
| *G05D 1/00* | (2006.01) | |
| *B60Q 5/00* | (2006.01) | |

(52) U.S. Cl.
CPC ............. *B60P 1/6418* (2013.01); *B60K 1/04* (2013.01); *B60L 50/60* (2019.02); *B60L 53/51* (2019.02); *B60P 1/43* (2013.01); *B60Q 1/50* (2013.01); *B60Q 5/00* (2013.01); *B65F 1/1452* (2013.01); *B65F 1/1468* (2013.01); *G05D 1/0011* (2013.01); *B65F 1/1473* (2013.01)

(58) Field of Classification Search
None
See application file for complete search history.

(56) References Cited

U.S. PATENT DOCUMENTS

| | | | |
|---|---|---|---|
| 8,146,695 B1* | 4/2012 | Ramshur | B62D 1/283 180/168 |
| 8,276,692 B1* | 10/2012 | Nwaeke | B62B 5/0069 180/65.1 |
| 8,733,479 B2* | 5/2014 | Holland | B60P 1/02 180/65.1 |
| 9,932,078 B1* | 4/2018 | Nehring | B60P 1/003 |
| 9,987,967 B1* | 6/2018 | Kimble | B60P 7/0807 |
| 10,286,558 B1* | 5/2019 | Asada | B65F 1/1468 |
| 2008/0038102 A1* | 2/2008 | Murphy | B65F 1/1468 414/403 |
| 2018/0079591 A1* | 3/2018 | Doty | H04W 4/024 |
| 2019/0033856 A1* | 1/2019 | Ferguson | G06N 20/00 |

* cited by examiner

*Primary Examiner* — Todd Melton

(57) ABSTRACT

A battery operated trash can carrier (100) for holding and transporting one or more containers is provided. The trash can carrier (100) includes a frame (102) having a laterally facing ramp (106) defining an entry means adapted to slidably receive one or more containers on a platform (104). The trash can carrier (100) includes a wheel base, where the wheel base includes a pair of wheels on one axle (108-1) and another pair of wheels on second axle (108-2). The trash can carrier (100) further includes a detachable power drive (110), battery compartment (130), ramp control (124), electronics control module (126) and a steering control (128). The detachable power drive (110) coupled to the wheel base, to power the pair of wheels on the one of the axle (108-2) and to steer the pair of wheels on the other axle (108-2) to transport carrier from one place to another.

18 Claims, 5 Drawing Sheets

BATTERY OPERATED AUTONOMOUS ROBOTIC TRASH CAN CARRIER

TECHNICAL FIELD

The present invention is generally related to a trash can carrier and more particularly to a battery operated trash can carrier or transportation apparatus with wheels.

BACKGROUND

The following description includes information that may be useful in understanding the present invention. It is not an admission that any of the information provided herein is prior art or relevant to the presently claimed invention, or that any publication specifically or implicitly referenced is prior art.

In many urban and suburban residential settings, trash is consolidated in conventional trash cans prior to removal by a waste collection agency. Due to associated odors and other health concerns, trash cans are generally located outdoors. The outdoor location further facilitates easy access by waste collection vehicles for emptying the trash cans.

The conventional trash or garbage container is normally placed in the garage of one's home or near the back door of residence, apartment, restaurant, store and manufacturing facility. With the exception of commercial and industrial usage where trucks equipped with front end lifts upend large trash bins into the trucks, most trash containers have to be hand carried to the collection point. In order to minimize the time and cost of refuse collection, and to reduce work related injuries, most urban areas require that trash be carried to the curb on garbage collection days rather than picked up from the back door/alley by garbage collectors. Thus, householders must carry their trash containers and recycle totes to the curbside outside their homes or the trash will not be collected. For many, curbside pickup is merely an inconvenience; for others, it is a difficult task to carry multiple containers to the curb.

Moving heavy and often unwieldy trash cans can be a strenuous activity, not only to those who are employed to do so, but also to homeowners. Carrying a heavy trash container to the alley or front curb for trash pickup is awkward for an adult and even more for a youngster. Moreover, moving heavily loaded garbage storage cans ordinarily requires great effort and can often injure the workman or person attempting to move the same. In addition, many individuals suffer from impairments of the back or spine and other physical problems which limit such activity. For those with chronic back pain, as well as for elderly people, transporting trash cans to the curb on collection day is a physically difficult and demanding task.

U.S. Pat. No. 2,745,676 discloses a carrier for transporting trash burners. The carrier comprises an open framework adapted to receive a trash burner. The framework is mounted upon wheels to facilitate movement from place to place. U.S. Pat. No. 2,881,007 discloses a rolling garbage can comprising a container mounted upon wheels. U.S. Pat. No. 2,904,345 is directed to attachment means for lifting and moving a container, in particular a garbage can. U.S. Pat. No. 3,188,109 discloses a combined cart and stand for containers such as garbage cans. Each of these patents disclose wheelbarrow type devices for holding and transporting a container whereby the container can be tilted and wheeled from place to place. Such trash can holders require the user to first lift and then to push or pull the trash can holder and the contents thereof to its destination. Merely lifting a cart holding a heavily loaded container can tax the strength of the user. Moving and steering such carts is also difficult and awkward.

It is conventional practice to empty trash cans into the open-top, trash-receiving body of a trash pick-up truck by means of an automatically operable mechanism attached to the truck alongside the body or by manual collection. The automatic removal is used extensively in cities where residences are provided by the waste management company with relatively large trash cans of uniform size and shape. Periodically, usually about once or twice a week, the residences and other establishments place their trash cans in a required location, such as curb-side or in an alley, and the truck is driven from one trash container to the next.

U.S. Pat. No. 4,313,612 discloses a convertible trash container carrier having four corner located retractable wheels. Retracting the wheel assemblage converts a wheeled carrier for transportation to a ground supported unit which is more or less a stationary holder of a trash container. Coupling means are described for attaching two trash container carriers together.

U.S. Pat. No. 5,110,147 is directed to a transporter for moving trash cans. A platform is provided having upwardly extending means which are radially adjustable for accommodating containers of different sizes. A plurality of wheels is provided underneath the platform, with at least one wheel being a swiveled forward wheel. Coupling holes are provided in the front and rear of the platform. A connector means can be hooked into the rear coupling hole of one platform and into the forward coupling hole of a trailing platform to form a train for moving several trash cans at once.

There remains a significant need for an autonomous trash can carrier system, methods, and technologies. Specifically, most prior efforts entail manual and difficult-to-use practices or systems. Some efforts are yet to simplify and improve the system focused on the automatic trash can maneuverability. Yet all efforts have failed to deliver the benefits. In addition, prior efforts have failed to describe an autonomous and robotic trash can carrier.

While many carriers, carts, dollies and other devices have been designed to simplify and reduce the difficulties of trash removal, a way to make trash removal faster, easier, and safer and more convenient continues to exist in the art.

Thus, there is still a need for an autonomous robotic trash can carrier or transportation apparatus to automatically carry the trash can from the house to the desired pick-up location.

SUMMARY OF THE INVENTION

The invention is directed to a carrier for holding and transporting containers such as garbage cans, trash can(s), recycle bin(s) and bags of landscape debris or combination thereof. The carrier of the invention is light weight yet extremely sturdy, and is easy to maneuver. One or more containers can be simultaneously transported with ease. The carrier is inexpensive, easy to assemble, and can be readily customized to accommodate a variety of end uses.

The present invention relates to an autonomous trash can carrier, the trash can carrier includes a battery-operated drive module that move trash can(s), recycle bin(s) and bags of landscape debris or combination thereof any of these trash storages.

In an embodiment, the autonomous trash can carrier can be of expandable length and width and/or of the fixed dimension.

The detachable electronic module of autonomous trash can carrier will provide output to power a pair of wheels on one axle and can provide control to steer a pair of wheels on second axle. The electronic module will be powered by batteries and the autonomous trash can carrier will have the following functionality including but not limited to:

i. Rechargeable battery
ii. Electric Motor drive to power the cart
iii. Steering functionality controlled by motor
iv. Remote control functionality
v. Connector for cart mounted sonar
vi. Connector for cart mounted radar
vii. Connector for cart mounted lights
viii. Connector for cart mounted beeper
ix. Connector trickle charger
x. Auxiliary connector
xi. Built in garage clicker/opener
xii. Built in timer
xiii. RC controller for override functionality
xiv. Storage memory for functionality
xv. Ramp Release.

The autonomous trash can carrier provides power input to the on-board electronics. The autonomous trash can carrier will includes a timer, a charger for battery charging, and an auxiliary connector for optional solar charging.

The autonomous trash can carrier can have a garage remote clicker to open and close garage or combination of garages as needed for its operation.

The autonomous trash can carrier further includes a memory storage memory for storing the instructions and can operate on a predefined time interval or can be manually controlled by a RC controller for override functionality. The operating instructions will basically trigger the software code to execute various functionality of the autonomous trash can carrier.

The autonomous trash can carrier comprises an in-built ramp for ease of loading and unloading wheeled trash cans. The ramp is attached on the one or more side of the autonomous trash can carrier. The ramp is used to carry the loading or unloading the trash cans or garbage cans to and from the carrier. The ramp will be electronically deployed and will fold back during operation. The autonomous trash can carrier can also be lowered using hydraulic lifters or spring based suspensions.

The autonomous trash can carrier comprises detachable all on-board electronics. These detachable modules can be upgraded with advanced communications and provide ease in serviceability.

The present method solves the problems and shortcomings mentioned in the background and provide an effective solution.

The summary of the invention does not necessarily disclose all the features essential for defining the invention. The invention may reside in a sub-combination of the disclosed features. The various combination and sub-combination are fully described in the detailed description.

BRIEF DESCRIPTION OF DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

The diagrams are for illustration only, which thus is not a limitation of the present disclosure, and wherein.

DETAILED DESCRIPTION OF DRAWINGS

Figure 1:
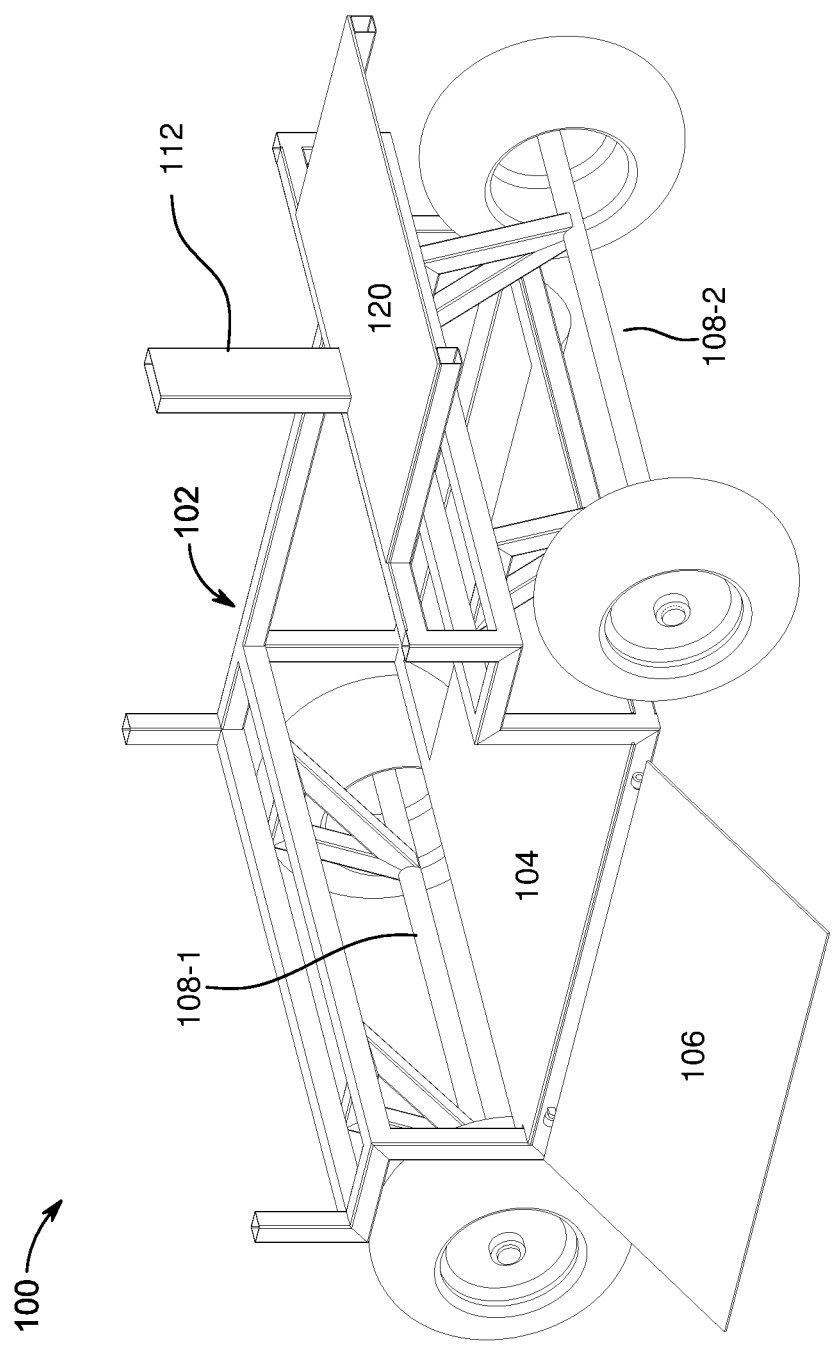
FIGS. 1-4 illustrate a schematic view of an autonomous trash can carrier, in accordance with an embodiment of the present invention.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure.

In the following description, numerous specific details are set forth in order to provide a thorough understanding of embodiments of the present invention. It will be apparent to one skilled in the art that embodiments of the present invention may be practiced without some of these specific details.

Various terms as used herein are shown below. To the extent a term used, it should be given the broadest definition persons in the pertinent art have given that term as reflected in printed publications and issued patents at the time of filing.

The present invention is directed to an autonomous trash can carrier according to an embodiment of the present invention. The autonomous trash can carrier is robotic in nature. The trash can carriers loads trash can(s) through the electro mechanically deployed ramp and collect it on the floor of the autonomous trash can carrier.

The autonomous trash can carrier of the present invention is designed to prevent the egress by the animals. The autonomous trash can carrier of the invention is controlled by a RF remote which controls the onboard electronics. The autonomous trash can carrier can also be controlled manually or maneuvered by an operator.

The autonomous trash can carrier of the invention is consisting of the metal frame. The metal frame gives the shape of a cart and also provides the durability and solidity to the cart. The cart also has a floor made of metal or like material to hold the weight of the trash can. The front and rear compartments of the autonomous trash can carrier comprises on-board motor and batteries. The motor and batteries are attached to the floor or mounted to the frame of the autonomous trash can carrier.

In another embodiment, the autonomous trash can carrier can have batteries in a separate compartment connected or attached to the autonomous trash can carrier. The batteries (not shown in drawings) may be placed in the floor of the autonomous trash can carrier or along with the frame.

In an embodiment, an expandable trash can) includes a battery-operated drive module that move trash can(s), recycle bin(s) and bags of landscape debris. The detachable power drive can power a pair of wheels on one axle and can steer a pair of wheels on second axle. The module will have the following functionality:

Rechargeable battery: The autonomous trash can carrier will have a rechargeable power source. The rechargeable power source has batteries which store the energy to power the motor, and also power the on-board electronics Electric Motor: The autonomous trash can carrier has one or more electric motors, which drive and steer the carrier, utilizing the power received from the electric rechargeable batteries.

Steering functionality: The autonomous trash can carrier has steering functionality, which is controlled by a dedicated motor or can have In-Wheel Motors controlled by Intelligent Controllers.

Remote control functionality: The autonomous trash can carrier also has wireless remote control functionality. The remote-control functionality will allow the user to manually control the trash can or command the autonomous functions using a dedicated remote, mobile phone, computers or electronic computing device using RF technologies. The remote control can also act as a bridge to allow the cart to connect to the internet.

Connector for cart mounted Distance Sensors: The autonomous trash can carrier will have an ultrasonic sensor such as SONAR, to measure distance which can be used with another sensors including but not limited to LIDAR sensors to provide input to on-board electronics. The SONAR will be connected to the autonomous trash can carrier for navigation and detection of obstacles.

Connector for cart mounted camera: The autonomous trash can carrier will have a camera or multiple cameras with on-board electronics. The cameras will be embedded in the frame in forward, backward and in side-ways and will provide real time visual feedback for Collison avoidance.

Connector for cart mounted lights: The autonomous trash can carrier will have a variety of visual outputs from on-board electronics. The cart mounted lights will be used to illuminate the path or notify operation to the user. The lights can be LEDs or any other type of illuminating devices.

Connector for cart mounted beeper: The autonomous trash can carrier will have a variety of audio outputs from on-board electronics. The on-board beeper will produce a notification sound or an audible alert as needed.

The components described above will work in a sync to remove power and steer trash cart at scheduled intervals to move from base location to public sidewalk or alley defined/programmed by user. The trash cart will return to its base at a predefined date and time to re-charge.

In an embodiment, the present invention provides an assembly of an expandable cart with load ramp, a drive module, and a kick stand (not shown in drawings). The kick stand can prevent tilting of the autonomous trash can carrier.

In another embodiment, autonomous trash can carrier comprises electronically controlled brakes to control speed during operation or prevent moving of cart once it has reached the destination points. The brakes may be disc brakes or drum brakes or emergency brakes.

The autonomous trash can carrier comprises metal frame to form the bottom and top structure. Also, the metal frame or fabricated material panels are used to form the floor and side panels. The panels are arranged at an angle and fastened/soldered to each other so to create an enclosure having bottom, front, back and side panels.

The frame may be made of any metal or alloy or composite materials.

The side panels or sheets can be hinged or attached to the lower frame. This will allow them open or deploy as needed. Also, by using the hinges, the one of the side panel will act like a ramp to the autonomous trash can carrier. The ramp mechanism is controlled electronically using the on-board electronics or a connected robotic unit. The ramp function module is connected or attached near the ramp hinges.

The autonomous trash can carrier is configured to have at least one wheeled axle located at the back portion of the bottom panel of the autonomous trash can carrier and at least one wheel attached to the front portion of the bottom panel of the trash cart. The wheeled axle powers autonomous trash can carrier for transportation. In an alternative embodiment of the invention, a second wheeled axle is attached to the front bottom panel of the trash cart. The autonomous trash can carrier can have in-wheel motors controlled by Intelligent Controllers. The four-wheeled autonomous trash can carrier is designed to handle more weight than the three wheeled version.

In another embodiment, the autonomous trash can carrier is equipped with a motor that is in direct communication with at least one wheel and/or axle that when powered by the power source, would rotate the wheel and/or axle so as to move the autonomous trash can carrier in the forward or reverse direction. The motor can be powered by, electric, batteries or some combination of each and can be controlled by either a remote control device or a direct control device.

Figure 2:
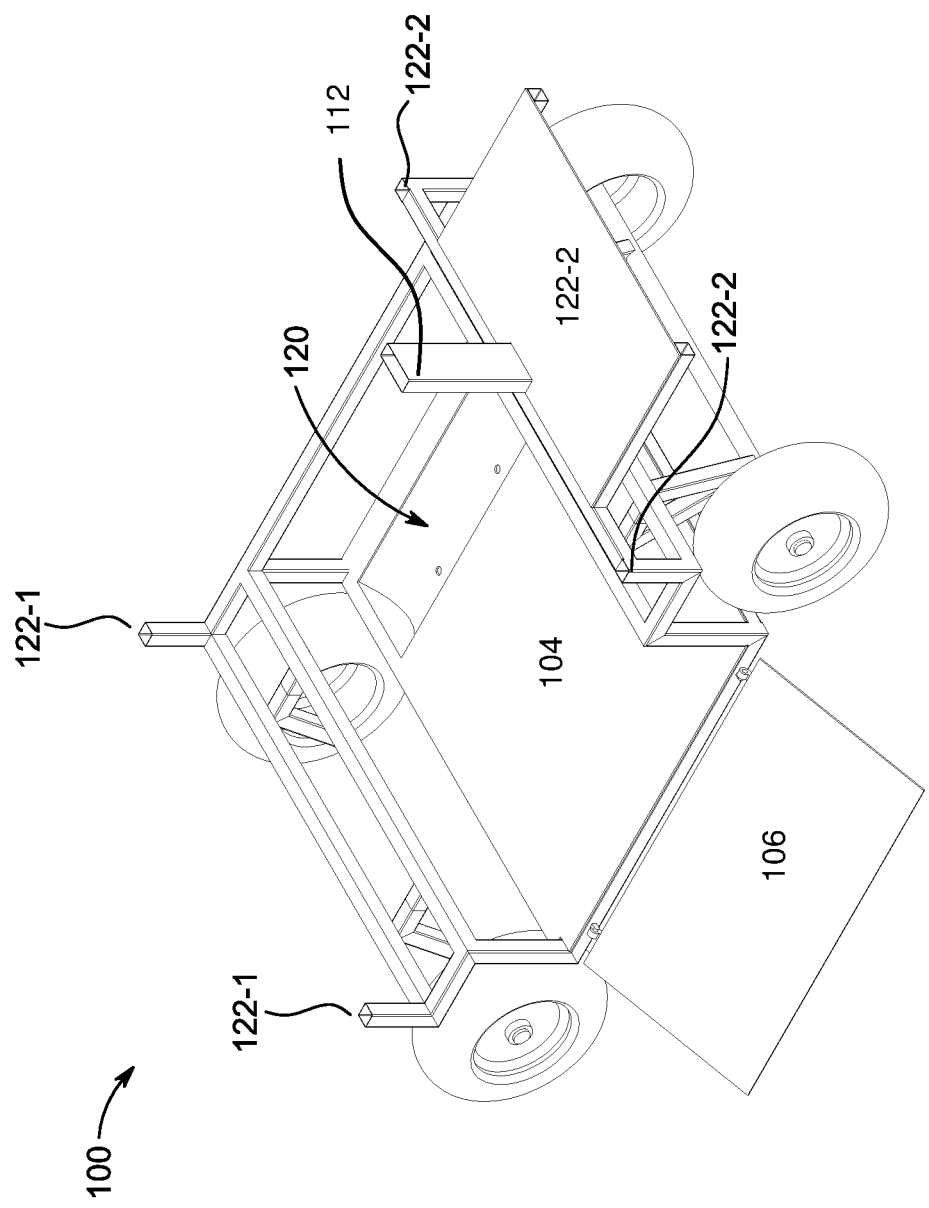

The autonomous trash can carrier may comprise a ramp release. The ramp is attached on the sides of the trash can carrier using hinges or other connecting assemblies. The ramp is used to load and unload the trash to the carrier as illustrated in FIG. 2.

The autonomous trash can carrier may comprise a handle and a kick stand. The kick stand prevents the cart from tilting over during the loading and unloading operation.

In another embodiment, the autonomous trash can carrier can be maneuvered using any electronic or mobile device from any distance by the user or any personnel authorized to operate such carrier, from yard to driveway and sidewalk. The autonomous trash can carrier will have a transceiving device; this device can be used for communication with any electronic mobile device.

In another embodiment, the autonomous trash can carrier will have storage for storing the instructions on docking and curbside location. The autonomous trash can carrier will use wireless communication technologies between an electronic mobile device and the autonomous trash can carrier.

The autonomous trash can carrier work in a sync with the pre-defined/pre-programmed mechanism to automatically release power cable and can steer through remote control or power and steer trash can carrier autonomously at scheduled intervals to move from base location to public sidewalk or alley. The autonomous trash can carrier can be summoned to return to its base or can return to a pre-defined location at a predefined date and time and can automatically connect to the charger or docking station to re-charge.

In another embodiment, the autonomous trash can carrier will then drive back to base location for standby till the next programmed day and time and can be summoned by the user to go to a predefined location It is possible for the user to pre-program the schedule and route during initial setup which can be reset.

The autonomous trash can carrier may include a teach pad with steering functionality where you can teach the path and cart can then follow predefined route from charging/home base location to the curb/sidewalk/haul away location. The autonomous trash can carrier can also be equipped with a GPS chip; the navigation/route information can be uploaded or stored in the memory.

The autonomous trash can carrier can include a weight sensor which will detect change in weight and will then after a pre-determined timed interval can move to a different or initial position programmed by the user.

The autonomous trash can carrier can be charged by dedicated plug-in charger or can have optional solar mounted charging infrastructure. The dedicated charge can offer fast charge and trickle charger functionality.

Used herein, the term "transceiving" may refer to transmitter and receiver device. The transmitting and receiving device may be in the form of tags, chips, controller etc.

Used herein, the term "wireless communication technologies" may refer to any communication technology employing electromagnetic fields to identify and track stationary or moving objects, including, but not limited to, Bluetooth, RFID, Wi-Fi, WLAN and BLE RF technology.

Used herein, the term "RFID reader" may refer to any communication device that may transmit and/or receive wireless signals to or from an RFID tag. The term "RFID reader" may be used interchangeably with the terms "RFID transceiver", "RFID transmitter". "RFID receiver", "transceiver", "transmitter" "receiver", "transmitter antenna", "receiver antenna", and "antenna".

The autonomous trash can carrier is equipped with various on-board sensors including SONAR (sound navigation ranging), RADAR (Radio Detection and Ranging), LIDAR (Light Detection and Ranging), LINE (with a combination of IR Transmitters and IR receivers also called photo diodes) follower and other navigation techniques for the carrier and to detect the presence of any obstacle in the path.

The autonomous trash can carrier is also equipped with LEDs or any illuminating devices to illuminate the path and to provide illumination for the on-board photographic devices.

The autonomous trash can carrier will have braking/speed control functionality, but can also have anti-slippage detections to detect and prevent the carrier from slippage.

The autonomous trash can carrier will be comprised of redundant sensors but can have clogged or failed sensors detection with auto cleaning. The redundant sensors improves system's Precision and Reliability.

The autonomous trash can carrier may utilize Artificial Intelligence (AI) and machine learning techniques for advanced and/or automated operations.

In another embodiment, the autonomous trash can carrier learns from the daily pattern and the knowledge base to automate the time schedule and location information. The artificial intelligence engine learns automatically without user intervention. However, there is always an over-ride switch or summon operation to correct and override the operation of the autonomous trash can carrier.

In another embodiment, the use of Artificial Intelligence (AI) will reduce human intervention over time and autonomous trash can carrier work automatically.

FIGS. 1-4 illustrate a schematic view of an autonomous trash can carrier, in accordance with an embodiment of the present invention.

In another embodiment, the autonomous trash can carrier of present invention is illustrated in FIG. 1.

Referring to FIGS. 1-4, a battery operated carrier (100) for holding and transporting one or more containers is provided in an embodiment of the present invention.

In an exemplary embodiment, the carrier (100) includes a frame (102) having a laterally facing opening defining an entry means adapted to slidably and removably receive the one or more containers on a platform or floor (104) enclosed in the frame. In this exemplary embodiment, the frame includes one or more ramps (106) enabling laterally facing opening at one or more side of the frame (102) to load and unload the one or more containers on the platform.

In an exemplary embodiment, the carrier (100) includes a wheel base connected to the frame below the platform. The wheel base includes at least two axles (108-1, 108-2). The wheel base can include a pair of wheels on one axle (108-1) and a pair of wheels on another or secondary axle (108-2).

In an exemplary embodiment, the carrier (100) includes a detachable power drive (110) coupled to the wheel base within adjacent one end of the frame to power the pair of wheels on the one axle (108-2) and to steer the pair of wheels on the second axle (108-1), such that at the pair of wheels transport carrier from one place to another.

In an exemplary embodiment, the detachable power drive comprises a battery, an electronic control module and also includes a powered motor.

In an exemplary embodiment, the battery is a rechargeable battery to power the motor that drives the carrier from the one place to another.

In an exemplary embodiment, the frame is an elongated, substantially rectangular frame having a size to permit it to be laterally removably received within a pair of opposed slots formed in the inner portion of the container.

In an exemplary embodiment, the slots each having openings facing the entry means to receive the rectangular frame.

Figure 3:
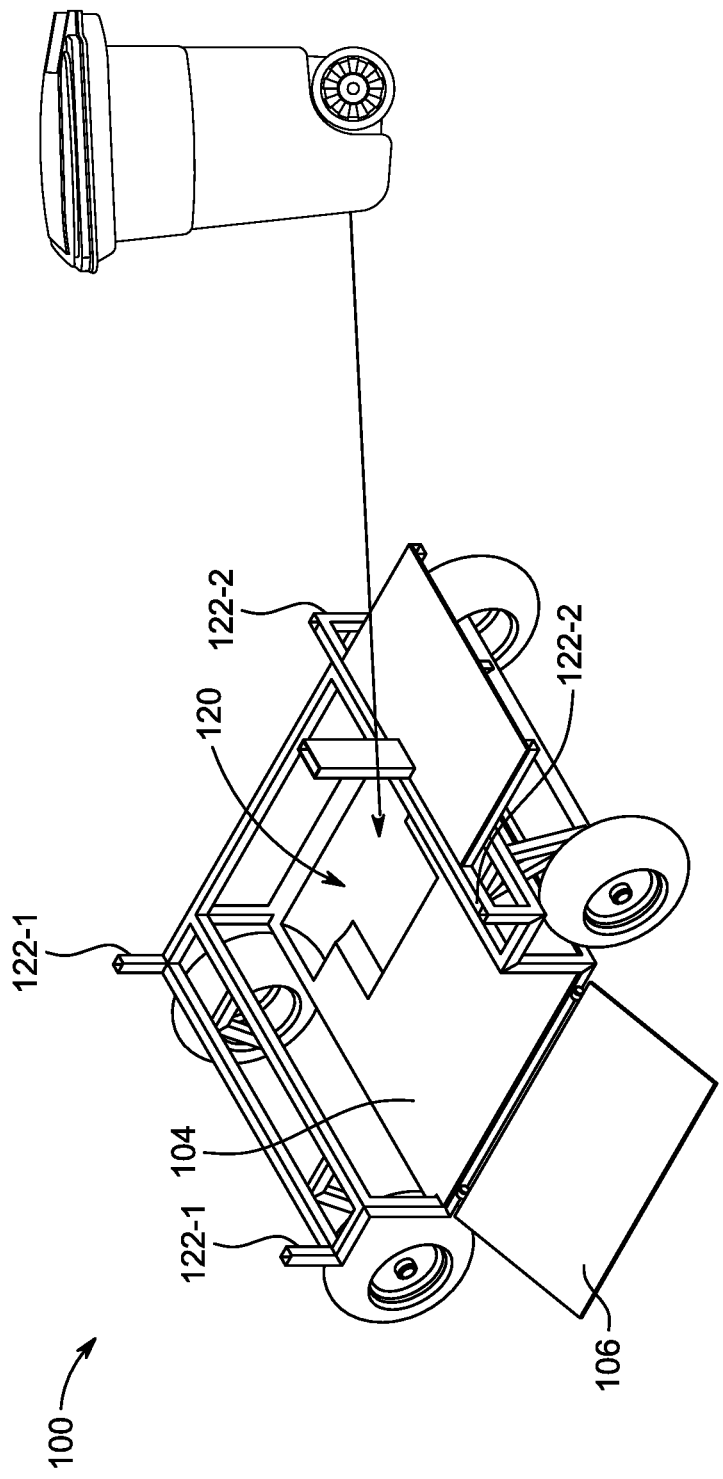

In another embodiment, the autonomous trash can carrier (100) comprises the base plate (104) with a curved channel or channels of different shapes or sizes or indents to hold the base and wheels of trash cart, this channel has one or more openings (120), to remove the water or liquid that may get accumulated on the floor of the autonomous trash can carrier as illustrated in FIG. 2 and FIG. 3.

In an exemplary embodiment, the autonomous trash can carrier (100) includes a detachable carrier (112) connected to the frame for securing additional bins or debris bags to be transported on the carrier from one place to another.

In an exemplary embodiment, the autonomous trash can carrier (100) includes at least one transceiver to receive one or more signals from remote location for directing transport of the carrier from one place to another.

In an exemplary embodiment, the autonomous trash can carrier (100) includes one or more sensors to receive one or more signals for directing transport of the carrier from one place to another.

In an exemplary embodiment, the autonomous trash can carrier (100) includes one or more sensors to measure distance and speed of the carrier, wherein the one or more sensors are at least selected from an ultrasonic sensor or an accelerator sensor or Lidar sensors.

In an exemplary embodiment, the autonomous trash can carrier (100) includes a GPS module for directing transport of the carrier from one place to another.

In an exemplary embodiment, the autonomous trash can carrier (100) includes one or more imaging sensors mounted at one of the upper frame ends (122-1 or 122-2) for capturing one or more images during the transport of the carrier from one place to another, wherein the one or more imaging sensors are selected form a camera sensor.

In an exemplary embodiment, the autonomous trash can carrier (100) includes one or more audio indicators mounted at one of the upper frame ends (122-1 or 122-2) for generating one or more audible alerts during the transport of the carrier from one place to another.

In an exemplary embodiment, the autonomous trash can carrier (100) includes one or more video indicators mounted at one of the upper frame ends (122-1 or 122-2) for generating one or more visual alerts during the transport of the carrier from one place to another.

In an exemplary embodiment, the autonomous trash can carrier (100) includes one or more lighting apparatus mounted at one of the upper frame ends (122-1 or 122-2) such as light emitting diode (LED) or laser or lights for generating one or more visual alerts during the transport of the carrier from one place to another.

In an exemplary embodiment, the autonomous trash can carrier (100) includes a garage remote clicker to open and close a gate of a garage or combination of garages for receiving the one or more containers on the platform.

In an exemplary embodiment, the autonomous trash can carrier (100) includes a memory storage module for storing one or more instructions, which upon execution by a processor installed at the battery operated carrier, operates one or more pre-configured functionalities of the battery operated carrier.

In an exemplary embodiment, the ramp (106) is electronically deployable after user request or once it has reached a point for trash collection, and will fold during the transport of the carrier from one place to another.

Figure 4:
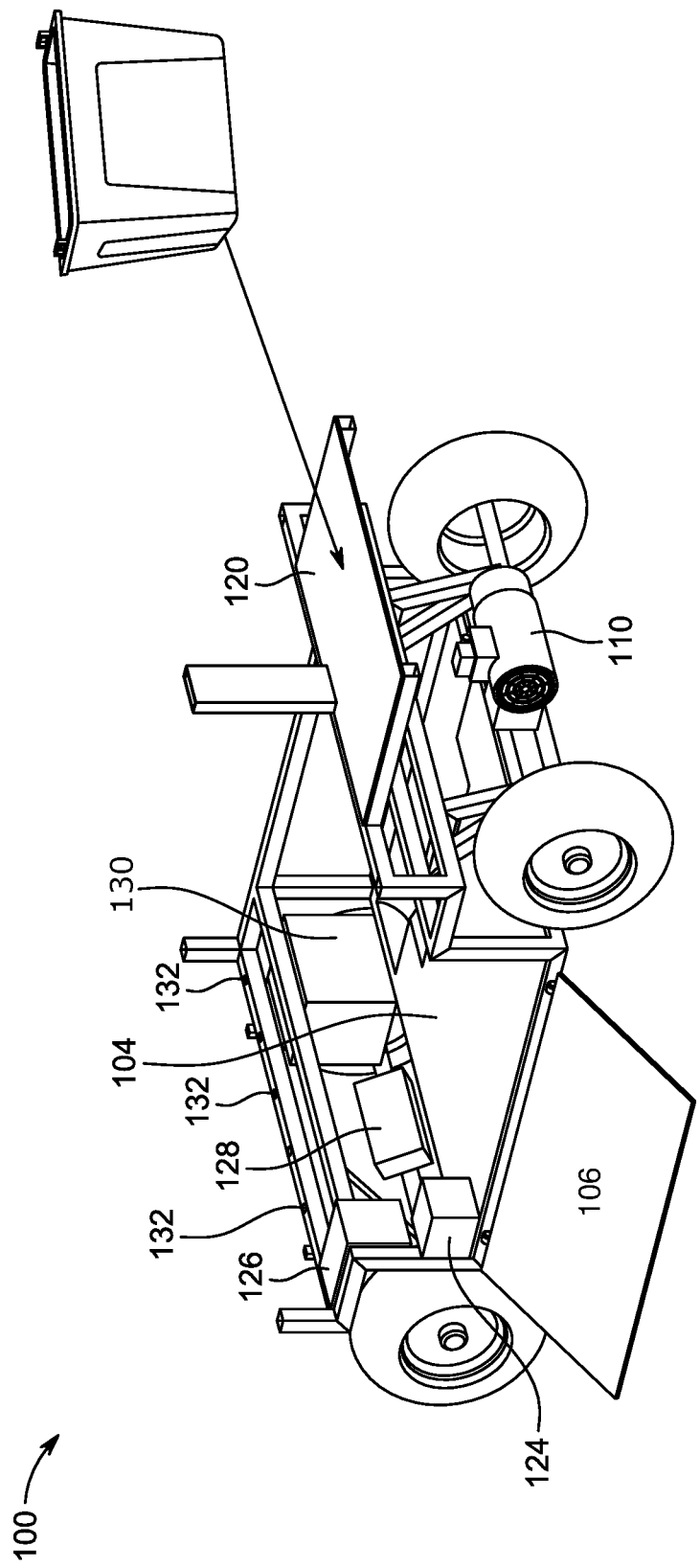

Referring to FIG. 4, the autonomous trash can carrier (100) includes in-frame or embedded cameras (132) to forward navigation and real-time feeds. The cameras (132) can be placed in the frames in forward, backward and sideway frame.

The autonomous trash can carrier (100), includes a ramp control module (124), an electronics control module (126), a steering control module on front axle (128), a power drive unit (110) on rear axle, a battery compartment (130). The position or location of various modules can also vary for different carrier's configurations and also to avoid any interference in proof of concept and implementation or applicability of such units or modules.

The autonomous trash can carrier (100) includes wiring arrangement for connecting various electrical components.

Figure 5:
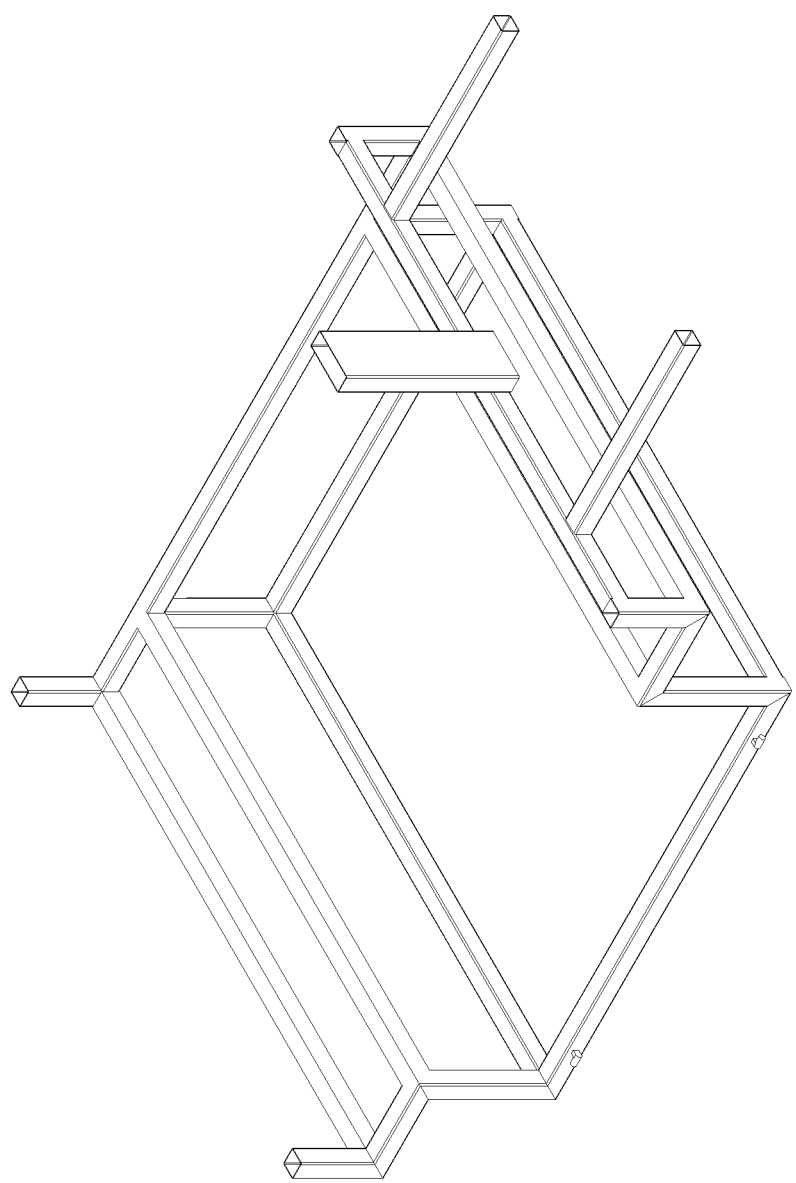
FIG. 5 illustrates a view of the frame or chassis used in autonomous trash can carrier, in accordance with an embodiment of the present invention.

FIG. 5 illustrates a view of the frame (102) used in the autonomous trash can carrier, in accordance with an embodiment of the present invention. The frame may be made of any metal or alloy or composites and combination of both.

In an exemplary embodiment, the platform comprises an anti-slip means or indents in the floor for preventing the one or more containers from sliding during the transport of the carrier from one place to another.

In an exemplary embodiment, the anti-slip means comprises at least one foot peg in communication with the one or more containers configured for easy entry into a surface so as to prevent the one or more containers from moving along during the transport of the carrier from one place to another.

In an exemplary embodiment, the anti-slip means are at least partially coated with an anti-slip coating selected from the group consisting of rubber, high friction material, anti-slip paint, anti-slip thermal sprayed powder coating, and mixtures thereof.

In an exemplary embodiment, the battery operated carrier is fully or partially autonomous vehicle controlled remotely by a human pilot.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, and firmware and/or by human operators.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention.

In the application, the terms such as "cart" or carrier" has been used interchangeably. However, the terms "cart" or "carrier" describes the same system and should be given broadest possible definition.

The terms such as "frame" or "chassis" can been used interchangeably. However, the terms "frame" or "chassis" describes the same system and should be given broadest possible definition.

What is claimed is:

1. A battery operated trash can carrier (100) for holding and transporting one or more containers, the carrier comprising:
    a frame (102) having a laterally facing opening defining an entry means adapted to slidably and removably receive the one or more containers on a platform (104) enclosed in the frame (102), wherein the frame (102) comprises at least one ramp (106) enabling laterally facing opening at corresponding side of the frame (102) to load and unload the one or more containers on the platform through the at least one ramp (106), and wherein the at least one ramp (106) is electronically deployable upon sensing a presence of the one or more containers in nearby proximity and folds during the transport of the carrier from one place to another;
    a wheel base removably connected to the frame below the platform, said wheel base comprising at least two axles (108-1, 108-2) having a pair of wheels on one axle (108-1) and a pair of wheels on second axle (108-2);
    a detachable power drive (110) coupled to the wheel base within adjacent one end of said frame (102) to power the pair of wheels on the at least one of the axle (108-1 or 108-2) and to steer the pair of wheels on the another axle, such that at the pair of wheels transport carrier from one place to another;
    wherein the frame (102) is an elongated, substantially rectangular frame having a size to permit it to be laterally removably received within a pair of opposed slots formed in an inner portion of the wheel base.

2. The battery operated carrier of claim 1, wherein the detachable power drive comprises a battery powered motor.

3. The battery operated carrier of claim 2, wherein the battery is a rechargeable battery to power the motor that drives the carrier from the one place to another, wherein the battery may be charged from any power outlet or using solar panels.

4. The battery operated carrier of claim 1, wherein the platform is connected with electronically deployable ramp (106) through hinges or connector.

5. The battery operated carrier of claim 1 further comprising:
    a detachable carrier (112) connected to the frame, for securing additional bins or debris bags to be transported from one place to another.

6. The battery operated carrier of claim 1 further comprising:
    a robotic unit comprises a transceiver, coupled to the platform, wherein the transceiver remotely receives the transmission signals and automatically schedule the movement of the said trash can carrier.

7. The battery operated carrier of claim 1 further comprising: one or more sensors to measure distance and speed of the carrier, wherein the one or more sensors are at least selected from an ultrasonic sensor or an accelerator sensor or Lidar sensors.

8. The battery operated carrier of claim 1 further comprising: a GPS module for directing transport of the carrier from one place to another.

9. The battery operated carrier of claim 1 further comprising: one or more in-frame imaging sensors (132) for capturing one or more images during the transport of the carrier from one place to another, wherein the one or more imaging sensors are selected form a camera sensor.

10. The battery operated carrier of claim 1 further comprising: one or more audio indicators for generating one or more audible alerts during the transport of the carrier from one place to another.

11. The battery operated carrier of claim 1 further comprising: one or more video indicators for generating one or more visual alerts during the transport of the carrier from one place to another.

12. The battery operated carrier of claim 1 further comprising: one or more light-emitting diode (LED) lights or lasers for generating one or more visual alerts during the transport of the carrier from one place to another.

13. The battery operated carrier of claim 1 further comprising: a garage remote clicker to open and close a gate of a garage or combination of garages for receiving the one or more containers on the platform of the carrier.

14. The battery operated carrier of claim 1 further comprising: a memory storage module for storing one or more instructions, which upon execution by a processor installed at the battery operated carrier, operates one or more pre-configured functionalities of the battery operated carrier.

15. The battery operated carrier of claim 1, wherein the platform comprises an anti-slip means for preventing the said one or more containers from sliding during the transport of the carrier from one place to another.

16. The battery operated carrier of claim 15, wherein said anti slip means comprises at least one foot peg in communication with said one or more containers configured for easy entry into a surface so as to prevent said one or more containers from moving along during the transport of the carrier from one place to another.

17. The battery operated carrier of claim 15, wherein said anti slip means are at least partially coated with an anti-slip coating selected from the group consisting of rubber, high friction material, anti-slip paint, anti-slip thermal sprayed powder coating, and mixtures thereof.

18. The battery operated carrier of claim 1, wherein the battery operated carrier is fully or partially autonomous vehicle controlled remotely by a human pilot.

\* \* \* \* \*